United States Patent [19]

Riehl

[11] Patent Number: 4,711,610
[45] Date of Patent: Dec. 8, 1987

[54] BALANCING CHUCK

[75] Inventor: Roger W. Riehl, Parsippany, N.J.

[73] Assignee: Machine Technology, Inc., Parsippany, N.J.

[21] Appl. No.: 848,806

[22] Filed: Apr. 4, 1986

[51] Int. Cl.⁴ ............................................... B23Q 3/00
[52] U.S. Cl. ..................................... 409/141; 51/235; 74/573 R; 269/21; 279/3
[58] Field of Search ..................... 279/1 J, 3; 408/143; 409/141; 51/235; 269/21; 74/573 R; 82/DIG. 9

[56] References Cited

U.S. PATENT DOCUMENTS

| | | | |
|---|---|---|---|
| 209,475 | 10/1978 | Harris | 74/573 R |
| 2,861,471 | 8/1956 | Kronenberg | 74/573 R |
| 3,410,154 | 9/1967 | Deakin | 74/573 R |
| 3,733,923 | 5/1973 | Goodrich et al. | 74/573 R |
| 3,799,619 | 3/1974 | LaBarber | 74/573 R |
| 3,809,050 | 5/1974 | Chough et al. | 51/235 |
| 3,970,260 | 7/1976 | Bruggisser et al. | 74/573 R |
| 4,060,009 | 11/1977 | Wyman | 74/573 R |
| 4,075,909 | 2/1978 | Deakin | 74/574 |
| 4,433,592 | 2/1984 | Tatsumi et al. | 74/573 R |
| 4,597,569 | 7/1986 | Itanoto et al. | 269/21 |

FOREIGN PATENT DOCUMENTS

| | | | |
|---|---|---|---|
| 3132919 | 9/1982 | Fed. Rep. of Germany | 269/21 |
| 141444 | 7/1985 | Japan | 269/21 |
| 611729 | 5/1978 | U.S.S.R. | 408/143 |

Primary Examiner—Z. R. Bilinsky
Attorney, Agent, or Firm—Lerner, David, Littenberg, Krumholz & Mentlik

[57] ABSTRACT

A balancing chuck is disclosed for semiconductor wafers having a flat region which typically causes wafer imbalance on spinning equipment. The wafer's flat region is determined by a proximity sensor mounted on a centering arm overlying the wafer. The chuck is constructed to include an annular race containing a spherical counterweight. As the chuck is rotated to determine the wafer's flat region, a magnet prevents movement of the spherical counterweight within the race and allows for its subsequent alignment with the mass imbalance. A plurality of circumferential pockets are provided within the race to retain the position of the counterweight which functions as a counterbalance maintained in proper angular alignment during spinning of the chuck.

35 Claims, 8 Drawing Figures

BALANCING CHUCK

BACKGROUND OF THE INVENTION

The present invention relates in general to a dynamic balancing device for rotating masses having an imbalanced condition, and more particularly, to a rotating balancing chuck for use in securing a semiconductor wafer thereto and which is constructed and arranged to reduce abnormal vibrations of the wafer which occur due to an unbalanced distribution of the mass of the wafer with respect to the axis of rotation of the chuck.

Semiconductor wafers are spun at high RPM to allow for the performance of a number of process operations, including coating, washing, developing, scrubbing and the like. Wafers of silicon and gallium arsenide crystals are often furnished with one or more flat regions around their perimeters. These flat regions have had two functional purposes. One purpose is to provide for alignment of the crystal structure of the wafer with the rectangular side of the integrated circuits being formed on the wafer itself. Thus, when the wafers are diamond scribed, they will break evenly and the cracking process will follow along the crystal grain. On the other hand, when such wafers are sawed to separate the IC chips, crystal grain alignment is not as critical. Wafer flat regions, however, are still in wide use today as a means of rough alignment orientation between subsequent patterns applied by alignment and exposure equipment.

As wafer sizes have increased over the years to 150 mm, and even 200 mm along with increases in thickness, the effect of weight imbalance due to these wafer flat regions on spinning equipment has become more pronounced. When such wafers are spun at high RPM, vibrations are created which have a number of adverse effects. For example, vibrations are transmitted to other parts of the equipment, such as wafer cassettes, causing position shifting of the wafer and causing photoresist flaking. In addition, these vibrations cause undue wear on all bearings and slides of the spinning equipment due to chatter, thereby necessitating frequent maintenance and repair. As a consequent of these vibrations, unexpected resonances get built into the spinning equipment, as the equipment is modified for other reasons. Further, sounds emitted during the spinning operation are distracting and annoying to operating personnel, thus detracting from the overall image of quality of the equipment.

There are known a number of automatic dynamic balancing techniques for dampening vibrations in rotating masses, such as rotors, shafts and the like. Typical of such techniques is the construction and arrangement of an automatic balancer of the type having a plurality of spherical counterweights or ball weights, in an annular race rotating about an axis, for example, as disclosed in any one of U.S. Pat. Nos. 4,433,592, 4,075,909, 4,060,009, 3,970,260, 3,799,619, 3,733,923, and 3,410,154. As known from these automatic balancers, the spherical counterweights are arranged circumferentially and movable in the annular race, and as the object to be balanced rotates about its axis, move to the side opposite to that on which the unbalanced load of the object is located to absorb the unbalanced condition. However, these automatic balancers are generally relatively complex in construction and are adapted only to grossly compensate for large mass imbalances in rotating objects. When semiconductor wafers are employed, the mass imbalance is often small and requires precision load compensation which cannot be achieved by these known automatic balancers. There is also known from U.S. Pat. Nos. 2,861,471 and 209,475 a balancing device which employs a securable counter mass, such as a plurality of bolts or metal segments, securely arrangeable within a race for compensation of mass imbalance due to a rotating object. However, these balancing devices also possess the aforementioned disadvantages.

SUMMARY OF THE INVENTION

In accordance with one aspect of the present invention, there is disclosed a chuck for balancing a rotating object comprising a housing securing the object for rotation therewith, an annular race within the housing, a counterweight positionable within the race, the race having a first region provided with a plurality of retaining means for releasably retaining the counterweight at a selected location within the first region during rotation of the housing and a second region constructed to permit relative movement between the counterweight and the housing, and control means for controlling the movement of the counterweight between the first region and the second region for arranging the counterweight in retained association with a selected one of the retaining means at a location corresponding to a selected portion of the object.

In accordance with another aspect of the present invention there is disclosed a chuck for balancing a rotating object comprising a housing securing the object for rotation therewith, a race arranged within the housing having an annular lower region and a coextensive annular upper region, and a counterweight positionable within the lower region and the upper region, the lower region having a plurality of circumferentially arranged pockets for releasably retaining the counterweight therein at a selected location within the lower region during rotation of the housing, the upper region constructed to permit relative movement between the counterweight and the housing, whereby the counterweight when in the upper region can be positioned overlying a selected pocket at a location corresponding to a selected portion of the object and retained at the location when the counterweight is positioned within the selected pocket.

In accordance with another aspect of the present invention there is disclosed a method for balancing a rotating semiconductor wafer having a chordal segment removed therefrom, the method comprising the steps of securing the semiconductor wafer to a rotatable chuck having an annular race containing a positionable counterweight, retaining the counterweight stationary within the race to permit relative movement between the counterweight and the chuck, rotating the chuck about an axis thereof to arrange a radius of the semiconductor wafer which extends through a midpoint of a chord forming the chordal segment into alignment with the counterweight, securing the counterweight within the race to prevent relative rotation between the counterweight and the chuck during the rotation thereof at its location to function as a counterbalance for the chordal segment removed from the semiconductor wafer.

BRIEF DESCRIPTION OF THE DRAWINGS

The above description, as well as further objects, features and advantages of the present invention, will be more fully understood by reference to the following detailed description of a presently preferred, but nonetheless illustrative, balancing chuck in accordance with the present invention, when taken in conjunction with the accompanying drawings.

DETAILED DESCRIPTION

Figure 1:
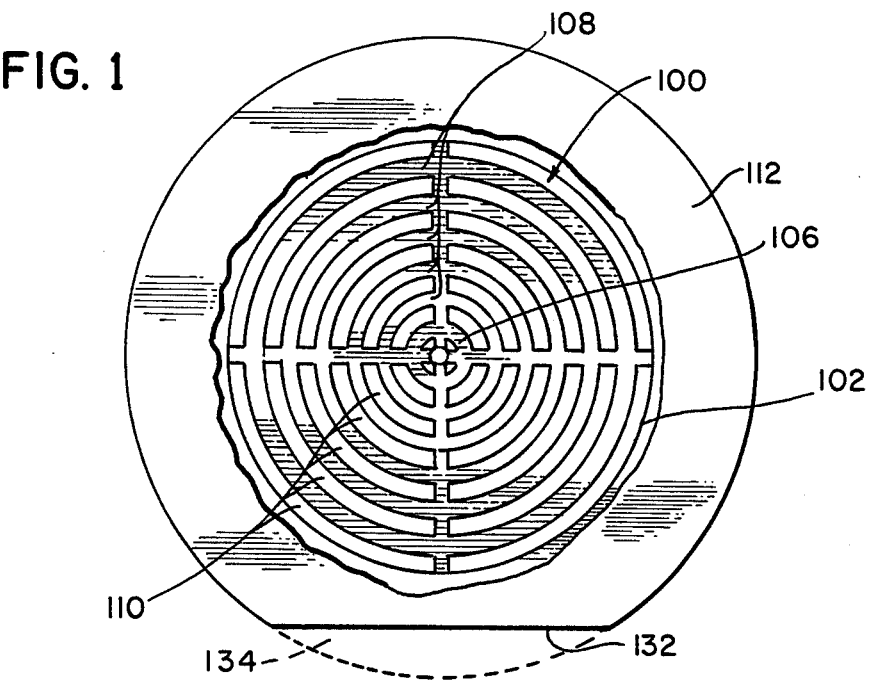
FIG. 1 is a top plan view having a section removed, and showing a semiconductor wafer secured by vacuum to an underlying balancing chuck for rotation about a common axis.
Figure 2:
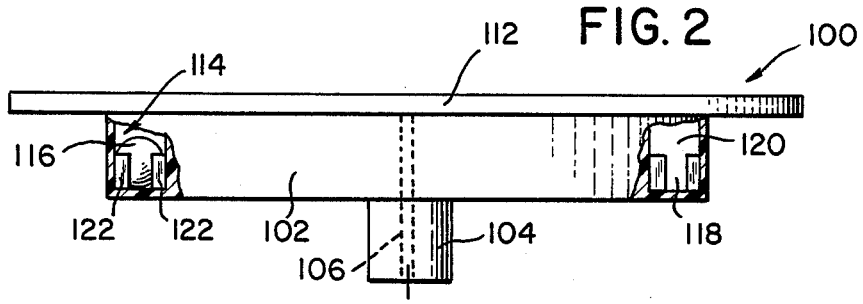
FIG. 2 is a side view of the balancing chuck as shown in FIG. 1 having a section removed, and showing an annular race provided with a counterweight secured within a pocket formed from a pair of spaced-apart circular segments.

Referring now to the drawings, wherein like reference numerals represent like elements, there is shown a balancing chuck generally designated by reference number 100. As shown in FIGS. 1 and 2, the chuck 100 is constructed of a circular housing 102 having a central hub 104 provided with a passageway 106 communicating with a plurality of surface grooves 108 defined between raised circular concentric segments 110. The grooves 108 communicate with a source of vacuum (not shown) through the passageway 106 for securing a semiconductor wafer 112 to the chuck 100. An annular race 114 is arranged circumferentially about the peripheral portion of the housing 102. Positioned within the race 114 is a single counterweight or spherical metal ball 116. The race 114 is totally enclosed to exclude dirt and dust which might otherwise interfere with the reliability of the operation of the chuck 100 as to be described hereinafter. In the preferred embodiment, the race 114 is hermetically sealed.

Figure 3:
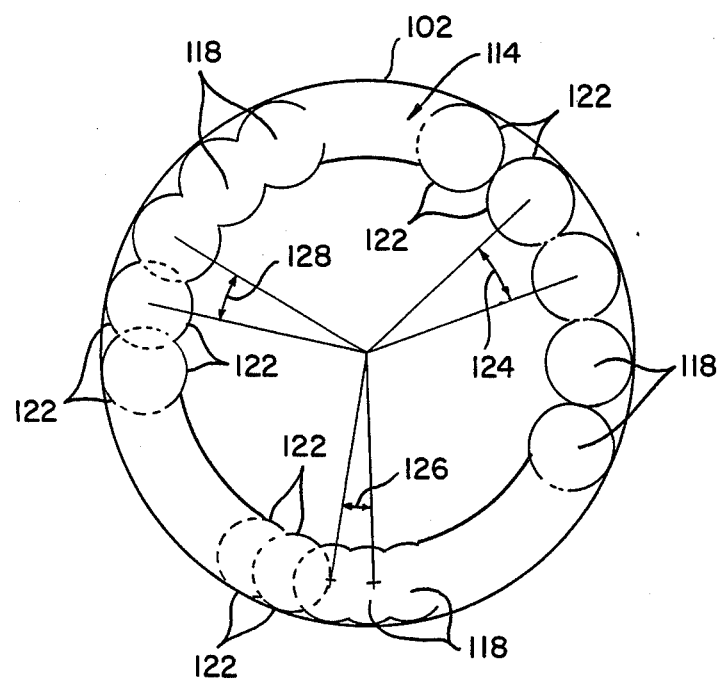
FIG. 3 is a top plan view showing three alternate arrangements of the pockets formed from the circular segments as shown in FIG. 2.
Figure 4:
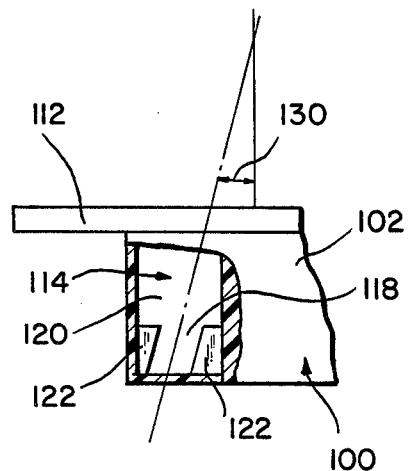
FIG. 4 is a side view, having a section removed, of a portion of the race showing the angular arrangement of the circular segments with respect to a vertical axis.

Referring now to FIGS. 2 through 4, the annular race 114 is divided into a lower region having a plurality of circumferentially arranged pockets 118 for each releasably retaining the counterweight 116 therein and an upper region 120 constructed to permit relative circumferential movement between the counterweight and the housing 102. Referring to FIG. 3, there is shown three of an infinite number of arrangements of the pockets 118 within the race 114. Each of the pockets 118 is formed between a pair of opposed arcuate or circular segments 122 which define an imaginary circle indicated by the dotted lines. In one embodiment, the center of the pockets 118 are offset by the angle designated 124 such that their imaginary circles are contiguous one another. In another embodiment, the center of the pockets 118 are offset by the angle designated 126 such that the imaginary circles are contiguous with the center of an adjacent pocket. However, as the angle decreases, the size of the pockets 118 also decreases, thereby approaching a dimensional tolerance which would render the pockets incapable of receiving a counterweight 116 of proper size. These two embodiments illustrate the practical extremes of the angular relationship between the pockets 118. In accordance with the preferred embodiment, the center of the pockets 118 are offset by the angle designated 128 such that their imaginary circles overlap one another by approximately one-third of their area. By selecting the appropriate angle between the center of the pockets 118, the number of pockets provided within the race 114 may be increased or decreased to effect the sensitivity and accuracy of locating the counterweight 116 with respect to the mass imbalance as to be described hereinafter. In accordance with the preferred embodiment, the angle 128 is approximately 3 degrees.

As shown in FIG. 2, it is preferred that the height of the segments 122 extend above the midpoint of the counterweight 116 to prevent the possibility of the counterweight jumping from one pocket during angular acceleration of the chuck 100 and from being bounced out of the pocket in the event of vibration. Similarly, to insure retention of the counterweight 116 within a pocket 118 while under the influence of centrifugal force due to the spinning action of the chuck 100, it is preferred that the pockets have a longitudinal axis arranged at an outwardly extending angle, designated 130 in FIG. 4, to the longitudinal vertical axis about which the chuck rotates. In accordance with the preferred embodiment, the angle 130 is approximately 4 degrees.

Figure 6:
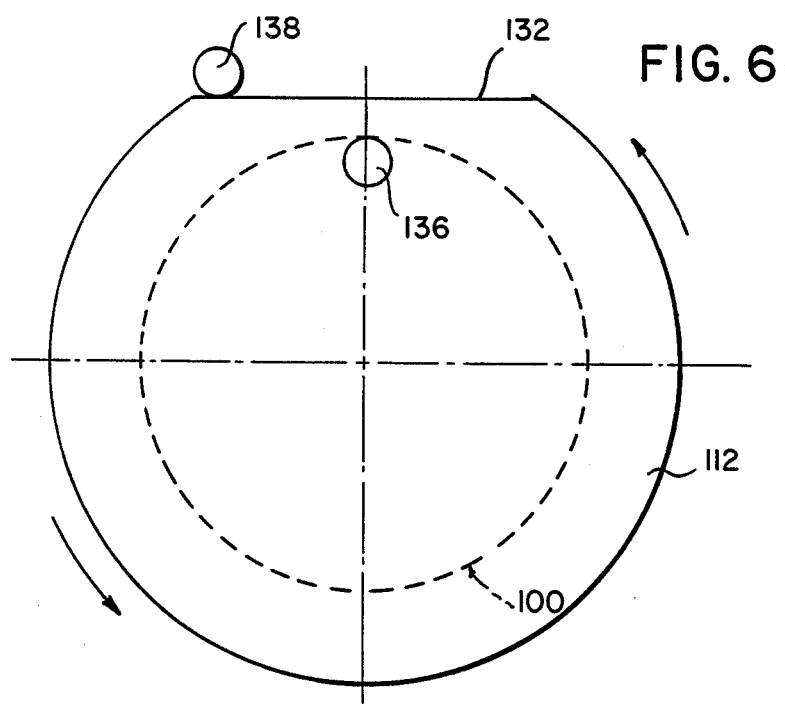
FIG. 6 is a top plan view of the semiconductor wafer in operative association with a magnet and proximity sensor for positioning the counterweight at the precise location required for offsetting the mass imbalance of the wafer.

As shown in FIG. 1, the semiconductor wafer 112 is provided with a flat region 132 which defines a chordal segment 134 removed from the remainder of the wafer as indicated by the dotted lines. The missing chordal segment 134 represents a mass which will impart an imbalance to the wafer 112 when secured to the chuck 100 and rotated about its geometric center. In order to compensate for the mass of the missing chordal segment 134, the counterweight 116 is positioned within the race 114 at a location in alignment with the midpoint of the flat region 132 as shown in FIG. 6.

In constructing the chuck 100, the radial location of the race 114 from the center of the chuck and the weight of the counterweight 116 is predetermined for counterbalancing the mass of the missing chordal segment 134. That is, there is a direct functional relationship between the weight of the counterweight 116 and the radius of the race 114. Specifically, as the weight of the counterweight 116 decreases, the radius of the race 114 is increased. Conversely, as the weight of the counterweight 116 increases, the radius of the race 114 is decreased. Upon proper selection of the weight of the counterweight 116 and corresponding radius for the race 114, the mass imbalance for the missing weight of the chordal segment 134 may be counterbalanced.

In order to determine the required weight of the counterweight 116 and radius for the race 114, the moment of inertia of the missing chordal segment 134 is obtained by first determining the weight of the missing chordal segment. Then, by determining the center of gravity of the missing chordal segment 134, the radius from its center of gravity to the geometric center of the wafer 112 can be measured. This radius when multiplied by the weight of the missing chordal segment 134 provides the moment of inertia which represents the mass imbalance due to the missing chordal segment. To provide a counterbalance for this mass imbalance, the moment of inertia of the counterweight 116 is matched with the moment of inertia of the missing chordal segment 134. This is accomplished by selecting the weight of the counterweight 116 so as when multiplied by the radius of the race 114, provides the same moment of inertia as the missing chordal segment 134.

From the foregoing, the radius of the race 114 may be varied, merely by changing the weight of the counterweight 116. In accordance with the preferred embodiment, the weight of the counterweight 116 is selected to be greater than the weight of the missing chordal segment 134 such that the radius of the race 114 is smaller than the radius of the wafer 112. In this manner, the size of the chuck 100 may be minimized while still providing for the ability to counterbalance the mass imbalance resulting from the missing chordal segment 134. However, reducing the radius of the race 114, with the necessity of increasing the size of the counterweight 116, also reduces the angular resolution of the chuck 100 by decreasing the number of potential pockets 118 available for receiving a counterweight, thereby reducing its sensitivity and accuracy.

Figure 5A:
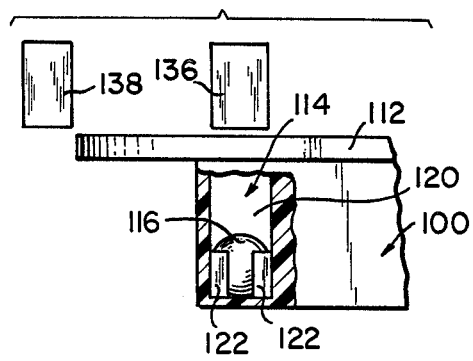
FIGS. 5A and 5B are side views, having a section removed, of a portion of the race showing the arrangement of the counterweight between a secured position within a pocket and a position permitting relative movement between the counterweight and the chuck.
Figure 5B:
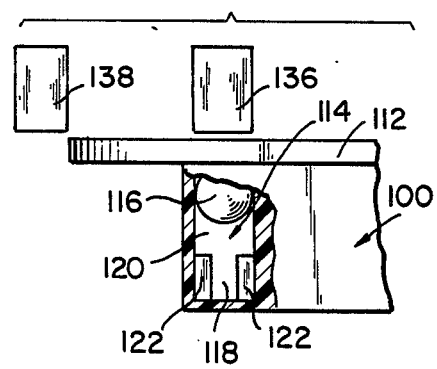

The operation of the balancing chuck 100, in accordance with the present invention, will now be described with reference to FIGS. 5A, 5B and 6. The wafer 112 is secured overlying the chuck 100 by means of vacuum supplied through passageway 106 to the grooves 108 which are defined by the wafer supporting segments 110. The geometric center of the wafer 112 is aligned with the axis of rotation of the chuck 100. A magnet 136 is mounted to a support (not shown) at a location overlying the race 114 and spaced slightly above the surface of the wafer 112. The magnet 136 may be provided as a permanent magnet or as an electromagnet connected to an appropriate circuitry for its control and operation. A light emitting diode proximity sensor 138 is mounted to a support (not shown) overlying the peripheral portion of the wafer 112 and spaced slightly above its top surface. This space provided between the top surface of the wafer 112 and the magnet 136 and proximity sensor 138 prevents interference during spinning of the wafer by the chuck 100.

Initially the counterweight 116 is arbitrarily received within one of the pockets 118. It is now required to position the counterweight 116 within that pocket 118 located opposite to the midpoint of the flat region 132 which defines one boundary of the missing chordal segment 134. To this end, the chuck 100 rotates the wafer 112 at low RPM in a counterclockwise direction, as shown in FIG. 6, until the proximity sensor 138 detects the beginning of the flat region 132. At such time, the chuck 100 is rotated 360 degrees in a counterclockwise direction until the proximity sensor 138 again senses the beginning of the flat region 132. During this rotation of the chuck 100, as the counterweight 116 within the race 114 passes under the magnet 136, the magnetic attraction causes the counterweight to be pulled out of its pocket 118 and held within the upper region 120. As previously described, the upper region 120 is constructed so as to permit relative movement between the counterweight 116 and race 114. As the chuck 100 is further rotated in its counterclockwise direction, the counterweight 116 will remain stationary within the race 114 due to the magnetic attraction with the magnet 136. Once the proximity sensor 138 detects the beginning of the flat region 132 for a second time, as shown in FIG. 6, the counterweight 116 will be at a location within the race 114 corresponding to the midpoint of the flat region 132. This condition is made possible by fixing the location of the magnet 136 with respect to the location of the proximity sensor 138 as shown. Specifically, the magnet 136 is fixed in a space angular relationship with the proximity sensor 138 such that the magnet is in alignment with the midpoint of the flat region 132 when the proximity sensor is at the beginning of the flat region.

Once the proximity sensor 138 has detected the beginning of the flat region 132 for a second time, rotation of the chuck rotation 100 is stopped. At this time the counterweight 116 is allowed to fall into an underlying pocket 118. If the magnet 136 is in the nature of an electromagnet, this is achieved by terminating current flow to the magnet. If, on the other hand, the magnet 136 is in the nature of a permanent magnet, the chuck 100 may be lowered to decouple the magnetic force, or the magnet may be raised to provide a similar effect. In any event, the counterweight 116 is now captured within a pocket 118 within the race 114 at a location corresponding to the midpoint of the flat region 132 such that its moment of inertia corresponds to the moment of inertia of the missing chordal segment 134. The accuracy of aligning the counterweight 116 with the midpoint of the flat region 132 is dependent upon the angular graduations between the centers of the pockets 118 as shown in FIG. 3. When securing a new wafer 112 to the chuck 100, the foregoing procedure is repeated to position the counterweight 116 at a location to counterbalance the mass imbalance caused by the missing chordal segment 134.

Figure 7:
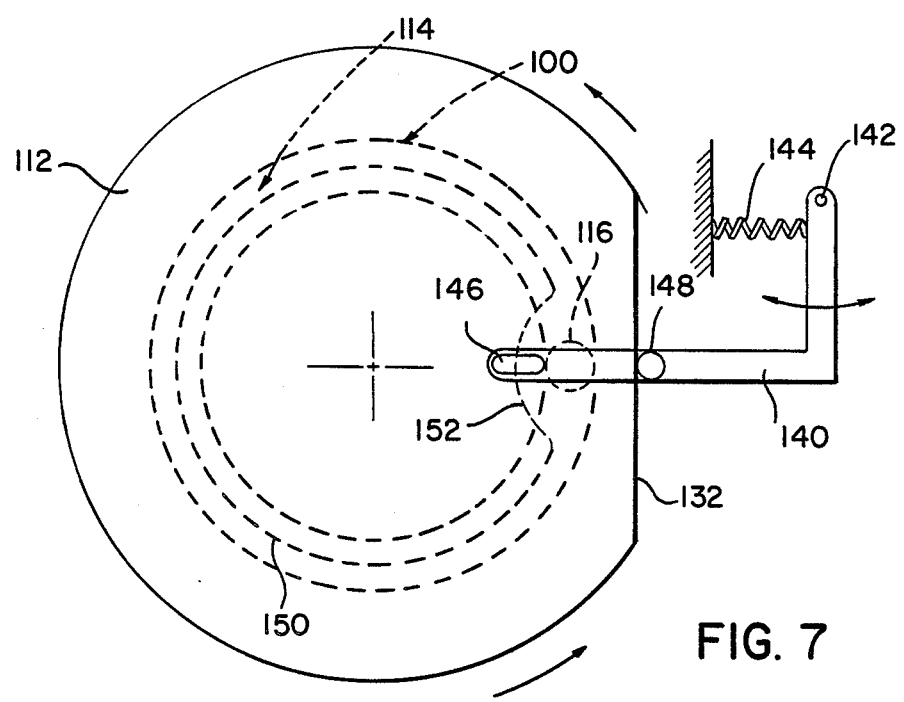
FIG. 7 is a top plan view of a semiconductor wafer showing another embodiment of the present invention for determining the precise location of the counterweight for offsetting the mass imbalance of the wafer.

In accordance with another embodiment of the present invention, the counterweight 116 may be positioned using a purely mechanical technique, as opposed to the electro-optic technique previously described. As shown in FIG. 7, an L-shaped arm 140 is pivotally attached about pivot point 142 and spring biased by a spring 144. A permanent magnet 146 is secured to one end of the arm 140 and a roller 148 is secured space therefrom. The distance between the center of the magnet 146 and roller 148 is determined such that as the roller engages the outer peripheral edge of the wafer 112, the center of the magnet follows a path midway within the race 114 as indicated by the dotted path 150. As the roller 148 approaches the flat region 132, the center of the magnet 146 follows along the arcuate path 152 until it reaches its maximum radially inward displacement when the roller has reached the midpoint of the flat region. At such time, the magnet 146 is displaced radially inward from the race 114 whereby the counterweight 116 is no longer magnetically attached to the magnet, and therefore, drops into an underlying pocket 118. As the roller 148 must contact the outer peripheral edge of the wafer 112, the electro-optic method previously described is preferred. However, both methods have utility with the chuck 100 of the present invention.

In accordance with another embodiment of the present invention, the counterweight 116 may be released by a magnet 136 of the electromagnet type without stopping the low RPM rotation of the chuck 100. An encoder (not shown) is provided for generating a pulse at the same angular interval corresponding to each of the pockets 118. Thus, as the chuck 100 is rotated, a pulse is generated by the encoder for each pocket 118. The angular phase of the encoded pulses is mismatched from the angular phase of the pockets 118 by a fixed amount to accommodate the time necessary for triggering off the magnet 136, the time necessary for the counterweight 116 to fall into a pocket, and the additional amount of rotation of the chuck 100 during these times. As such, the counterweight 116 will fall centrally into a specific pocket 118 without bouncing on the segments 122 when the magnet 136 is triggered off at the next encoder pulse following the second sensing of the flat region 132 of the wafer 112. The angular offset of the magnet 136 to the proximity sensor 138 is adjusted to place the counterweight 116 dead-center of the flat region 132 when the second sensing of the flat region occurs, i.e., the pocket 118 which is equal to or less than one-half of a pocket from the center of the flat region. Thus, the maximum error is $\pm\frac{1}{2}$ the pocket interval.

Although the invention herein has been described with reference to particular embodiments, it is to be understood that these embodiments are merely illustrative of the principles and application of the present application. It is therefore to be understood that numerous modification may be made in the illustrative embodiments and that other arrangements may be devised without departing from the spirit and scope of the present invention as defined by the appended claims.

What is claimed is:

1. A chuck for balancing a rotating object comprising a housing securing said object for rotation therewith, an annular race within said housing, a counterweight positionable within said race, said race having a first region provided with a plurality of retaining means for releasably retaining said counterweight at a selected location within said first region during rotation of said housing and a second region constructed to permit relative movement between said counterweight and said housing, and control means for controlling the movement of said counterweight between said first region and said second region for arranging said counterweight in retained association with a selected one of said retaining means at a location corresponding to a selected portion of said object.

2. The chuck of claim 1, further including vacuum means in operative association with said housing for securing said object thereto by vacuum, said object comprising a semiconductor wafer.

3. The chuck of claim 1, wherein said counterweight comprises a single spherical counterweight having a mass sufficient to balance said object when retained at said location corresponding to said selected portion of said object.

4. The chuck of claim 1, wherein each of said retaining means comprises a pocket for releasably receiving said counterweight therein.

5. The chuck of claim 1, wherein said control means comprises a permanent magnet adapted for magnetically holding said counterweight within said second region.

6. The chuck of claim 5, wherein said permanent magnet is attached to a pivotal arm adapted for positioning said permanent magnet along a path having a first portion overlying said race and a second portion radial inward of said race.

7. The chuck of claim 1, wherein said control means comprises an electro magnet adapted for magnetically holding said counterweight within said second region.

8. The chuck of claim 1, further including locating means for locating said counterweight at said selected portion of said object.

9. The chuck of claim 8, wherein said locating means comprises a light emitting device.

10. The chuck of claim 8, wherein said locating means comprises a roller engaging the peripheral edge of said object.

11. A chuck for balancing a rotating object comprising a housing securing said object for rotation therewith, a race arranged within said housing having an annular lower region and a coextensive annular upper region, and a counterweight positionable within said lower region and said upper region, said lower region having a plurality of circumferentially arranged pockets for releasably retaining said counterweight therein at a selected location within said lower region during rotation of said housing, said upper region constructed to permit relative movement between said counterweight and said housing, whereby said counterweight when in said upper region can be positioned overlying a selected pocket at a location corresponding to a selected portion of said object and retained at said location when said counterweight is positioned within said selected pocket.

12. The chuck of claim 11, further including vacuum means in operative association with said housing for securing said object thereto by vacuum, said object comprising a semiconductor wafer.

13. The chuck of claim 11, further including control means for controlling the movement of said counterweight between said lower region and said upper region for arranging said counterweight within a selected one of said pockets at a location corresponding to a selected portion of said object.

14. The chuck of claim 13, wherein said control means is operative for holding said counterweight stationary within said upper region during rotation of said housing and for positioning said counterweight into said selected pocket at said location corresponding to said selected portion of said object.

15. The chuck of claim 14, wherein said control means comprises a permanent magnet.

16. The chuck of claim 14, wherein said control means comprises an electro magnet.

17. The chuck of claim 14, further including locating means for location said counterweight at said selected portion of said object.

18. The chuck of claim 17, wherein said locating means comprises a light emitting device.

19. The chuck of claim 11, wherein each of said pockets is provided by a pair of spaced-apart circular segments.

20. The chuck of claim 19, wherein an imaginary circle formed from adjacent pockets by opposing circular segments have a common overlapping portion.

21. The chuck of claim 19, wherein an imaginary circle formed from adjacent pockets by opposing circular segments are contiguous.

22. The chuck of claim 11, wherein the height of said pockets extend above the midpoint of said counterweight.

23. The chuck of claim 11, wherein said pockets have a longitudinal axis arranged at an outwardly extending angle to a longitudinal axis about which said housing rotates.

24. The chuck of claim 11, wherein said race is located at the peripheral portion of said housing.

25. The chuck of claim 11, wherein said race is enclosed by said housing.

26. A method for balancing a rotating semiconductor wafer having a chordal segment removed therefrom, said method comprising the steps of securing said semiconductor wafer to a rotatable chuck having an annular race containing a positionable counterweight, retaining said counterweight stationary within said race to permit relative movement between said counterweight and said chuck, rotating said chuck about an axis thereof to arrange a radius of said semiconductor wafer which extends through a midpoint of a chord forming said chordal segment into alignment with said counterweight, securing said counterweight within said race to prevent relative rotation between said counterweight and said chuck during the rotation thereof at its location to function as a counterbalance for said chordal segment removed from said semiconductor wafer.

27. The method of claim 26, further including sensing a leading edge of said chordal segment for a first time during said rotating of said chuck, and terminating said rotating of said chuck upon sensing said leading edge of said chordal segment for a second time, whereby said radius of said semiconductor wafer is in alignment with said counterweight and said midpoint of said chord forming said chordal segment.

28. The method of claim 26, further including providing the moment of inertia of said counterweight to correspond substantially to the moment of inertia of said chordal segment removed from said semiconductor wafer.

29. The method of claim 26, wherein said securing of said semiconductor wafer to said chuck comprises applying a vacuum thereto.

30. The method of claim 26, wherein said retaining said counterweight stationary within said race comprises arranging a magnet in operative association with said counterweight overlying said race.

31. The method of claim 30, wherein said arranging said magnet comprises maintaining said magnet is in spaced-apart relationship from said counterweight overlying said race.

32. The method of claim 26, wherein said securing said counterweight within said race comprises positioning said counterweight with a pocket formed within a portion of said race.

33. The method of claim 32, wherein said securing said counterweight within said race is performed during rotation of said chuck.

34. The method of claim 33, wherein said securing said counterweight within said race is initiated in response to encoded pulses corresponding to the angular intervals of said pockets.

35. The method of claim 34, wherein the angular phase of said encoded pulses is mismatched from the angular phase of said pockets a sufficient amount to allow said counterweight to be secured within a pocket at the midpoint of said chord forming said chordal segment.

* * * * *